US011831786B1

(12) United States Patent
Ratts et al.

(10) Patent No.: US 11,831,786 B1
(45) Date of Patent: Nov. 28, 2023

(54) CHAIN OF TRUST

(71) Applicants: Steven D. Ratts, Melbourne, FL (US); Brian J. Noe, Indian Harbour Beach, FL (US); Francis B. Afinidad, Melbourne, FL (US)

(72) Inventors: Steven D. Ratts, Melbourne, FL (US); Brian J. Noe, Indian Harbour Beach, FL (US); Francis B. Afinidad, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1017 days.

(21) Appl. No.: 16/189,305

(22) Filed: Nov. 13, 2018

(51) Int. Cl.
*H04L 9/00* (2022.01)
*H04L 9/32* (2006.01)
*G06F 21/64* (2013.01)
*G06F 21/57* (2013.01)

(52) U.S. Cl.
CPC .......... *H04L 9/3265* (2013.01); *G06F 21/572* (2013.01); *G06F 21/645* (2013.01); *H04L 9/3236* (2013.01); *H04L 9/50* (2022.05)

(58) Field of Classification Search
CPC . H04L 9/3265; H04L 9/3236; H04L 2209/38; G06F 21/572; G06F 21/645
See application file for complete search history.

(56) References Cited

U.S. PATENT DOCUMENTS

| 6,035,346 | A | * | 3/2000 | Chieng | ................. | G06F 15/177 |
|-----------|---|---|--------|--------|------------------|-------------|
|           |   |   |        |        |                  | 710/10      |
| 6,782,349 | B2 |   | 8/2004 | Challener et al. | | |
| 7,069,440 | B2 |   | 6/2006 | Aull | | |
| 7,275,155 | B1 |   | 9/2007 | Aull | | |
| 7,747,852 | B2 |   | 6/2010 | Aull | | |
| 8,166,289 | B2 |   | 4/2012 | Owens et al. | | |
| 8,429,423 | B1 |   | 4/2013 | King et al. | | |
| 8,874,916 | B2 |   | 10/2014 | Smith et al. | | |

(Continued)

OTHER PUBLICATIONS

Gui Y, Siddiqui AS, Saqib F. Hardware based root of trust for electronic control units. InSoutheastCon Apr. 19, 2018 20189 (pp. 1-7). IEEE. (Year: 2018).*

(Continued)

*Primary Examiner* — Daniel B Potratz
*Assistant Examiner* — Syed M Ahsan
(74) *Attorney, Agent, or Firm* — Tarolli, Sundheim, Covell & Tummino L.L.P.

(57) ABSTRACT

A system for establishing and maintaining a chain of trust can include a root of trust (RoT) executing a root trusted server that pushes authenticated code and data into memory of a given node in a plurality of nodes. The RoT can also record a memory address range of a static portion of the authenticated code and a corresponding static data in the given node and cause the given node to execute the authenticated code in response to the pushing to establish a trusted relationship between the trusted server of the RoT and the given node. The root trusted server also monitors the given node to ensure that the given node executes trusted operations. The authenticated code in the memory of the given node can include a trusted server that pushes authenticated code into memory of another node in the plurality of nodes.

18 Claims, 5 Drawing Sheets

(56) References Cited

U.S. PATENT DOCUMENTS

| | | |
|---|---|---|
| 8,935,746 B2 | 1/2015 | Vetillard |
| 9,070,251 B2 | 6/2015 | Laputz et al. |
| 9,098,706 B1 | 8/2015 | Kennedy |
| 9,331,988 B2 | 5/2016 | Ponsini |
| 9,520,994 B2 | 12/2016 | Ponsini |
| 9,569,602 B2 | 2/2017 | Molleau et al. |
| 9,600,291 B1 | 3/2017 | Atsatt |
| 9,613,215 B2 | 4/2017 | Cox et al. |
| 9,830,456 B2 | 11/2017 | Grieco et al. |
| 10,028,010 B2 | 7/2018 | Pendakur et al. |
| 10,637,877 B1* | 4/2020 | Ramanathan ......... G06F 21/556 |
| 2006/0026417 A1* | 2/2006 | Furusawa ............ G06F 21/575 713/2 |
| 2010/0122076 A1 | 5/2010 | Witty |
| 2014/0095876 A1 | 4/2014 | Smith et al. |
| 2015/0012737 A1 | 1/2015 | Newell |
| 2015/0154405 A1 | 6/2015 | Chen et al. |
| 2015/0268952 A1 | 9/2015 | Ponsini |
| 2016/0036587 A1 | 2/2016 | Hans et al. |
| 2016/0266943 A1 | 9/2016 | Hans |
| 2017/0039352 A1 | 2/2017 | Volkening et al. |
| 2017/0329943 A1 | 11/2017 | Choi et al. |
| 2018/0041341 A1* | 2/2018 | Gulati ................... H04L 9/0877 |
| 2018/0357183 A1* | 12/2018 | Kumar ................... G06F 21/57 |

OTHER PUBLICATIONS

Gui, Y., Siddiqui, A. S., & Saqib, F. (Apr. 2018). Hardware based root of trust for electronic control units. In SoutheastCon 2018 (pp. 1-7). IEEE. (Year: 2018).*

Gui, Yutian, Ali Shuja Siddiqui, and Fareena Saqib. "Hardware based root of trust for electronic control units." SoutheastCon 2018. IEEE, 2018. (Year: 2018).*

Non Final Office Action for U.S. Appl. No. 16/425,614 dated May 7, 2021.

Final Office Action for U.S. Appl. No. 16/359,744 dated Dec. 16, 2020.

Perez: "Silicon Systems Security and Building a Root of Trust"; IEEE Asian Solid-State Circuits Conference; Nov. 9-11, 2015/ Xiamen, Fujian, China; 4 pages.

* cited by examiner

CHAIN OF TRUST

TECHNICAL FIELD

The present disclosure relates to computer security. More particularly, this disclosure relates to a system and method for establishing and maintaining a chain of trust.

BACKGROUND

A Root of Trust (RoT) is a programmable hardware component that is able to perform a trusted boot. As used herein, the term "trusted boot" indicates when power is applied to the RoT, the RoT automatically brings itself up to a fully operational state with tests for integrity and authenticity of any software or firmware to be executed within the RoT. Furthermore, the RoT continues to monitor itself for continued trust. The RoT does not need any other entity to monitor the RoT. The RoT can serve as a separate computing engine controlling a trusted computing platform cryptographic processor on a computing device in which the RoT is embedded.

In computer security, a chain of trust is established by validating the integrity and the authenticity of each software and firmware component from an end entity up to a root certificate issued by a trusted authority. A chain of trust is intended to ensure that only trusted software, hardware and firmware can be used while still retaining flexibility. For example, a chain of trust is employable to allow multiple users to create and use software on the system, which would be less secure if all encryption keys were stored directly in hardware. A chain of trust starts with hardware that will only boot from software or firmware that is digitally signed. As an example, the signing authority signs boot programs that enforce security, such as running programs that are themselves signed.

SUMMARY

One example relates to a system for establishing and maintaining a chain of trust. The system can include a root of trust (RoT) executing a root trusted server that pushes authenticated code into memory of a given node in a plurality of nodes, wherein the given node is held in reset. The RoT can also record a memory address range of a static portion of the authenticated code in the given node and release the given node from reset in response to the pushing to establish a trusted relationship between the trusted server of the RoT and the given node. The root trusted server also monitors the given node to ensure that the given node executes trusted operations and to ensure that the authenticated code and static data in the given node are unchanged. The authenticated code in the memory of the given node can include a trusted server that pushes authenticated code into memory of another node in the plurality of nodes, wherein the other node is held in reset. The trusted server can also record a memory address range of the authenticated code and static data in the other node and cause the other node to execute the authenticated code in response to the pushing to establish a trusted relationship between the trusted server of the given node and the other node. The trusted server further monitors the other node to ensure that the other node executes trusted operations and to ensure that the authenticated code and the static data in the other node are unchanged.

Another example relates to a system for establishing and maintaining a chain of trust. The system can include a RoT executing a root trusted server that establishes a trusted relationship with a first node of a plurality of nodes. The trusted relationship ensures that the first node of the plurality of nodes executes trusted operations on authenticated code stored in memory of the first node and to ensure that the authenticated code and static data in the first node are unchanged. The authenticated code in the memory of the first node can include a trusted server that establishes and maintains a trusted relationship with a subset of nodes in the plurality of nodes. The establishing and maintaining can include pushing authenticated code into memory of each node in the subset of nodes in the plurality of nodes. The establishing and maintaining can also include recording a memory address range of the static portion of the authenticated code and corresponding static data in each node in the subset of nodes. The establishing and maintaining can further include causing each node in the subset of nodes to execute the authenticated code in response to the pushing to establish a trusted relationship between the trusted server of the first node and each node of the subset of nodes. The establishing and maintaining can still further include monitoring each node in the subset of nodes to ensure that each node in the subset of nodes executes trusted operations and to ensure that the authenticated code and the static data in each node in the subset of nodes are unchanged.

Yet another example relates to a method that includes establishing and maintaining, by a root trusted server executing on a RoT, a trusted relationship between the root trusted server and a first node of a plurality of nodes. The root trusted server can ensure that the first node executes trusted operations and ensures that authenticated code and static data in the first node is unchanged. The method can also include elevating, by the root trusted server, the first node to a trusted server, wherein the first node executes the trusted server as a trusted operation. The method can further include establishing and maintaining, by the trusted server executing on the first node, a trusted relationship with a second node of the plurality of nodes. The trusted server executing on the first node can ensure that the second node executes trusted operations and ensures that the authenticated code and static data in the other node are unchanged.

DETAILED DESCRIPTION

Figure 1:
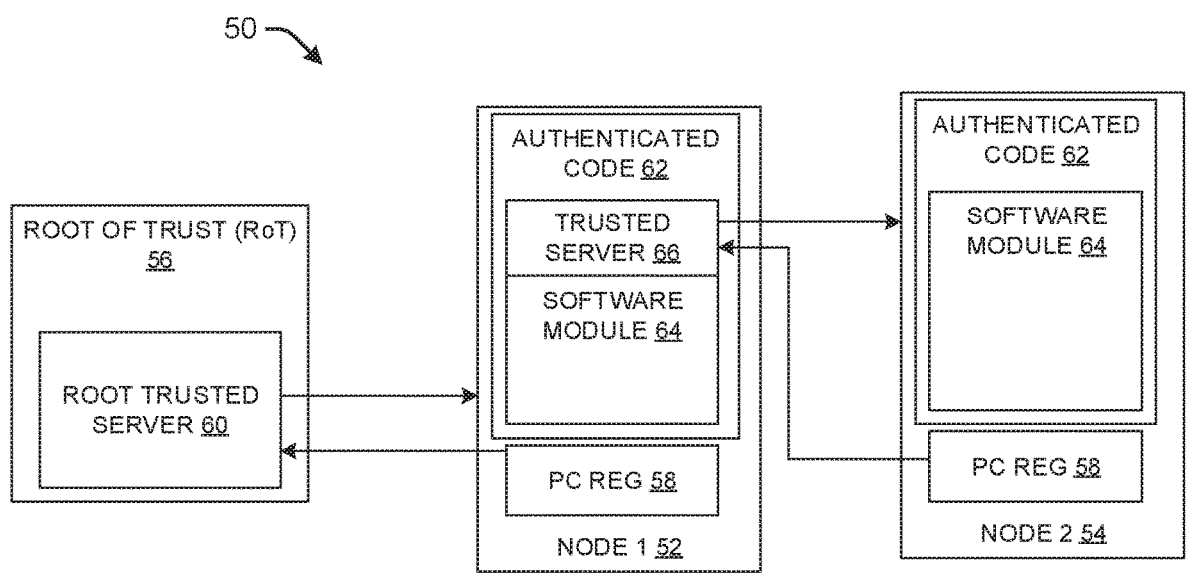
FIG. 1 illustrates an example of a system for establishing and maintaining a chain of trust in a computing environment.

The present disclosure relates to systems and methods for establishing and maintaining a chain of trust amongst nodes of a computing system. The system can include a root of trust (RoT) executing a root trusted server from which the chain of trust extends. The RoT is configured/programmed such that after boot-up, the RoT executes a root trusted server that establishes and maintains a trusted relationship with a first node of a plurality of nodes (computing platforms). As used herein, "establishing and maintaining" a trusted relationship ensures a trusted server (the root trusted server) that a node (operating as a trusted client) only executes trusted operations, namely operations that have been authenticated in a manner described herein.

To establish the trusted relationship, in some examples, the root trusted server holds the first node of a plurality of nodes in reset to prevent the first node from executing code that has not been authenticated. The RoT can employ cryptographic techniques (e.g., a public key certificate) to authenticate a signed software package assigned to the first node. The RoT can push the authenticated code (e.g., machine code) into the memory of a first node while the first node is held in reset. In other examples, as explained herein, the first node is not held in reset while the authenticated code is pushed into the memory of the first node. Additionally, the root trusted server records a memory address range of the static portion of the authenticated code and corresponding static data in the first node. The root trusted server can re-authenticate the authenticated code and the corresponding static data after the authenticated code is stored in the memory of the first node in a manner described herein. The root trusted server can release the first node from reset (allowing the first node to boot) or activate the authenticated code in response to the pushing to finalize the trusted relationship between the trusted server of the RoT and the given node. In this manner, the first node starts-up as a trusted client of the root trusted server.

To maintain the trusted relationship, the root trusted server monitors the first node to ensure that the given node executes trusted operations, namely the authenticated code. In particular, the root trusted server can monitor a value stored in a program counter register of the first node to ensure that the first node is only executing instructions that are stored within the memory address range of the authenticated code. Additionally, to maintain the trusted relationship, the root trusted server can re-verify the authenticated code and the corresponding static data to ensure that the authenticated code remains unchanged in a manner described herein.

In some examples, the first node can extend the chain of trust to a second node of the plurality of nodes. In such a situation, the root trusted server initializes (or in some example elevates) the first node as a trusted server. For example, the authenticated code in the memory of the first node can include the trusted server that (upon execution) operates in a similar manner as the root trusted server. Alternatively, in some examples, code for the trusted server can be pushed into in the memory of the first node by the root trusted server in a subsequent push operation, such that the trusted server is added to the authenticated code for the first node thereby elevating the formerly trusted client to be a trusted server.

Upon execution, the trusted server establishes a trusted relationship between the trusted server of the first node and the second node. More particularly, in some examples, the trusted server on the first node resets the second node, preventing the second node from executing code. Additionally, the trusted server executing on the first node can authenticate a signed software package (e.g., machine code) assigned to the second node. In some examples, the trusted server executing on the first node pushes authenticated code into memory of the second node in the plurality of nodes while the second node is held in reset. In other examples, the trusted server pushes the authenticated code into the memory of the second node without resetting the second node. The trusted server executing on the first node records a memory address range of a static portion of the authenticated code and corresponding static data in the second node. The trusted server of the first node can re-authenticate the authenticated code and the corresponding static data after the authenticated code is stored in the memory of the first node in a manner described herein. The trusted server of the first node releases the second node from reset or activates the authenticated code in response to the pushing to finalize the trusted relationship. This release allows the second node to boot, execute the authenticated code stored in the second node's memory thereby finalizing the trusted relationship between the trusted server of the first node and the second node. That is, the second node starts-up as trusted client of the trusted server of the first node.

To maintain the trusted relationship, the trusted server of the first node monitors the second node to ensure that the second node executes trusted operations, namely the authenticated code. In particular, similar to the root trusted server, the trusted server executing on the first node re-verifies static portion the authenticated code and the corresponding static data executing on the second node. Additionally, to maintain the trusted relationship, the trusted server executing on the first node can monitor a value stored in a program counter register of the second node to ensure that the second node is only executing instructions that are stored within the memory address range of the authenticated code.

Accordingly, by employment of the systems and methods described herein, the chain of trust extending from the RoT through the plurality of nodes can be established and maintained. This chain of trust ensures that each node in the chain of trust executes authenticated code, and prevents malicious code provided from a third party from modifying the authenticated code. Moreover, the systems and methods described herein can be scaled for any number of nodes and nearly any configuration, such as a single branch (linear) or multi-branch (non-linear) chain of trust.

FIG. 1 illustrates an example of a system 50 for establishing and maintaining a chain of trust. The system 50 includes a first node 52 and a second node 54 along with a Root of Trust (RoT) 56, from which the chain of trust extends. For purposes of simplification of explanation, in the example illustrated, the system 50 includes the first node 52 and the second node 54, but in other examples, many more nodes (e.g., any number of nodes) can be employed.

The first node 52 and the second node 54 can be representative of a computing platform. That is, the first node 52 and the second node 54 can each be an instance of hardware capable of executing machine readable instructions. Thus, the first node 52 and the second node 54 can include a memory that stores machine readable instructions and data. The memory can be representative of volatile memory such as random access memory (RAM). The first node 52 and the second node 54 can also include a processing unit that accesses the memory and executes the machine readable instructions. The processing unit can be implemented as one or more processor cores. In some examples, a subset (or all) the first node 52 and the second node 54 can be implemented on a single, multi-core processor chip. In other examples, the first node 52 and the second node 54 can be implemented as separate computing devices (e.g., separate processor chips).

The first node 52 and the second node 54 are each associated with a program counter register 58 (labeled in FIG. 1 as "PC REG"), such that there are equal number of program counter registers 58 as nodes. The program counter register 58 of the first node 52 and the second node 54 stores an address of a next instruction that is to be executed by the corresponding processing unit. That is, the program counter register 58 of the first node 52 "points to" the next instruction to be executed by the processing unit of the first node 52. In some examples, the program counter register 58 can be referred to as an instruction pointer (IP), instruction address register (IAR), an instruction counter (IC) or an instruction sequencer (IS).

The RoT 56 can be implemented as a stand-alone hardware device, namely an integrated circuit (IC) chip, such as an Application Specific Integrated Circuit (ASIC) chip, a Field Programmable Gate Array (FPGA), etc. The RoT 56 can include an embedded signed public key certificate. The signed public key certificate can be issued by a trusted authority that securely stores a private key of an asymmetric encryption key pair (sometime referred to simply as a "key pair"). The signed public key certificate includes a public key of the asymmetric encryption key pair. In this manner, the public key of the signed public key certificate is employable to decrypt data encrypted with the private key of the trusted authority. In some examples, the signed public key certificate also includes an encrypted version of a hash of the public key (the hash may also be referred to as a message digest) and a plaintext version of the public key. The encrypted version of the hash of the public key has been encrypted with the private key of the trusted authority. A hash function employed to generate the hash of the public key can be stored in software, firmware or hardware or the RoT 56.

Upon boot-up and/or reset, the RoT 56 can execute a sequence of actions to initiate the establishment of the chain of trust on the system 50. In some examples during the boot-up sequence, the RoT 56 can decrypt the encrypted version of the hash of the public key using the public key of the trusted authority embedded in the self-signed root pubic key certificate to form a decrypted hash. Additionally, during the boot-up sequence, the RoT can execute the hash function on the public key and compare the results of the hash to the decrypted hash to verify the authenticity and integrity of the public key certificate. In a similar manner, the RoT can employ the (authenticated) public key certificate to authenticate a software package or subordinate certificates signed by the trusted authority to verify the authenticity and the integrity of the software package. In other examples, additional and/or other authentication techniques are employable to verify the authenticity and the integrity of the software package.

Continuing with the boot-up sequence, in response to verifying the authenticity and integrity of the software package, the RoT 56 can execute a root trusted server 60. Upon execution, the boot-up sequence of the RoT 56 is completed.

In some examples, in response to completion of the boot-up, the root trusted server 60 executes a trust initialization operation that establishes the chain of trust extending from the RoT, to the first node 52 and to the second node 54. In the trust initialization operation, the root trusted server 60 establishes a trusted relationship with the first node 52. In some examples, during the trust initialization operation, the root trusted server 60 sets the first node 52 to reset and holds the first node 52 in reset. As used herein the phrase "hold in reset" (and its derivatives) indicates that a node (the first node 52 in the present example) is powered-on, and is prevented by another node (the root trusted server 60 in the present example) from booting and/or executing machine readable instructions. Continuing with the trust initialization operation, the root trusted server 60 locates a signed software package assigned to the first node 52 (which can be stored internally or externally to the first node 52) that is digitally signed by the trusted authority. Alternatively, the software package assigned to the first node 52 can be signed with a subordinate certificate by another entity that is authorized to do so. In such a situation, the subordinate certificate can be authenticated by the signed public key certificate, and (after authentication), the subordinate certificate can be employed to authenticate the software package assigned to the first node. The RoT 56 can employ the public key certificate to verify the authenticity and integrity of the signed software package. Furthermore, in some examples, the root trusted server 60 extracts and stores an encrypted (by the private key of the trusted authority) hash of the static portions of the signed software package, which corresponds to a signature of the signed software package. In some examples, the encrypted hash of the static portions of the signed software package is referred to as a "pristine hash" or "golden hash". In such situations, the signed software package includes information characterizing where the static portion of the signed software package is positioned in the overall signed software package so that the root trusted server 60 knows what portion of the memory of the first node 52 to produce confirmation hashes from.

Upon authenticating the signed software package, continuing with the trust initialization operation the root trusted server 60 pushes the signed software package assigned to the first node 52 into the memory of the first node 52, where the (authenticated) software package resides as authenticated code 62. As used herein, the term "pushes" (and its derivatives) indicates that an external node (the root trusted server 60 of the RoT 56 in the present example) executes or causes execution of a memory write (including, but not limited to a direct memory access (DMA) write) to the memory of another node (the first node 52 in the present example). The root trusted server 60 records (stores) the memory address range of a static portion of the authenticated code 62 and corresponding static data that includes a software module 64, which upon execution, causes the first node 52 to start-up as a trusted client for the root trusted server 60. It is noted that the "authenticated code 62" corresponds to static portions of the software module 64 and the "static data" refers to portions of program data that are unchanging (static) during execution. Portions of the software module 64 that are not static, such as dynamic data of the program data are not part of the authenticated code 62 or the corresponding static data.

In other examples, the root trusted server 60 can push the signed software package assigned to the first node 52 into the memory of the first node 52 without resetting the first node 52. For example, the signed software package can include an application launcher embedded therein. Such an application launcher can cause the first node 52 to execute an application from a specific memory address in response to an activation signal being provided from the root trusted server 60. In such a situation, the first node 52 can include a reserved memory range in static data to receive the signed software package without reset. Moreover, in this situation, the root trusted server 60 can change memory range for the authenticated code 62 of the first node 52 to the reserved memory range in the static data.

Additionally, continuing with the trust initialization operation, upon pushing the signed software package to the first node 52 (corresponding to the authenticated code 62), the root trusted server 60 re-authenticates the authenticated code 62 by executing a hash on the authenticated code and corresponding static data, and comparing the hash to a decrypted version of a hash embedded in the signed software package. In some examples, the memory address range is hashed and an encrypted hash of the memory address range (stored in the signed software package) is decrypted by the root trusted server 60. The results of the hashed memory address range and the decrypted hashed memory address range are compared by the root trusted server 60 to verify that the authenticated code 62 is correctly placed in the memory of the first node 52. Continuing with the trust initialization operation, the trusted server 66 of the first node 1 can re-authenticate the authenticated code 62 after the authenticated code is pushed into the memory of the second node 54.

Continuing with the trust initialization operation, upon pushing the software package to the first node 52 (corresponding to the authenticated code 62), the root trusted server 60 can finalize the trusted relationship between the root trusted server 60 and the first node 52. In some examples, to finalize the trusted relationship, the root trusted server 60 releases the first node 52 from reset, allowing the first node 52 to boot and execute machine code for the software module 64, such that the first node 52 starts-up as a trusted client for the root trusted server 60. Alternatively, to finalize the trusted relationship, the root trusted server 60 can provide an activation signal causing the first node 52 to execute the software module 64. In either situation, the root trusted server 66 causes the first node 52 to execute the software module 64 in response to the pushing to finalize the trusted relationship between the RoT 56 and the first node 52. Upon finalizing the trusted relationship, the trusted relationship is established and the trust initialization operation is completed. It is noted that the trusted relationship is established upon executing each action of the trusted initialization operation. That is, if an action of the trusted initialization operation is unable to complete successfully (such as a failed authentication), the trusted relationship is not established.

Additionally, the root trusted server 60 can switch to a trust maintenance operation to maintain the trusted relationship with the first node 52. To maintain the trusted relationship, the root trusted server 60 monitors the authenticity and integrity of the static portion of the software module 64 operating on the first node 52. More particularly, periodically, continuously and/or asynchronously the root trusted server 60 re-verifies the authenticated code 62 and the corresponding static data of the first node 52. As used herein, the term "re-verifying" of the authenticate code and the corresponding static data refers to a executing a hash on the authenticated code and the corresponding static data by an upstream node (e.g., by the root trusted server 60), and the upstream node compares the hash to a previously stored hash (e.g., a "pristine hash") of the authenticated code and the corresponding static data. Additionally, the root trusted server 60 monitors (periodically, continuously and/or asynchronously) the value stored in the program counter register 58 of the first node to ensure that the first node 52 is only executing operations in the memory address range recorded for the static portion of the authenticated code 62. If the root trusted server 60 verifies the authenticity and the integrity of the authenticated code 62 and the corresponding static data, and that the program counter register 58 only stores addresses within the memory address range recorded for static portion of the authenticated code 62, the root trusted server 60 can be assured that the first node 52 is only executing trusted operations and that the corresponding static data is unchanged.

Additionally, the authenticated code 62 in the first node 52 can include a trusted server 66. The trusted server 66 can be embedded in the signed software package assigned to the first node 52 or could be added to the memory of the first node 52 in a subsequent push operation. Execution of the trusted server 66 initializes the first node 52 as a combination of a trusted client and a trusted server or elevates the first node 52 from a trust client to a combination of a trusted client and a trusted server, thereby extending the chain of trust in the system 50.

The trusted server 66 of the first node 52 can operate in a manner similar to the root trusted server 60. Accordingly, the trusted server 66 of the first node 52 can execute a trust initialization operation to establish a trusted relationship between the trusted server 66 of the first node 52 and the second node 54. In some examples, in the trust initialization operation, the trusted server 66 of the first node 52 can reset the second node 54 and hold the second node 54 in reset. Continuing with the trust initialization operation, before the first node 52 is released from reset, the trusted server 66 of the first node 52 locates a signed software package assigned to the second node 54 and authenticates the signed software package to verify the authenticity and integrity of the signed software package. In other examples, the second node 54 is not reset. In these examples, the signed software package can include an application launcher that can be activated by the trusted server 66 of the first node 52.

Furthermore, in some examples, the trusted server 66 of the first node 52 extracts and stores an encrypted (by the private key of the trusted authority) hash of the signed software package, which corresponds to a signature of the signed software package. Additionally, continuing with the trust initialization operation, the trusted server 66 of the first node 52 pushes the signed software package into the memory of the second node 54 to form authenticated code 62 in the second node 54. The authenticated code 62 of the second node 54 includes a software module 64 that includes machine readable instructions. The memory address range of the static portion of the authenticated code 62 and corresponding static data of the second node 54 can be recorded (stored) by the trusted server 66 for subsequent authentication and/or monitoring. In some examples, the memory address range is hashed and an encrypted hash of the memory address range (stored in the signed software package) is decrypted by the trusted server 66 of the first node 52. The results of the hashed memory address range and the decrypted hashed memory address range are compared by the trusted server 66 of the first node 52 to verify that the authenticated code 62 is correctly placed in the memory of the second node 54. Continuing with the trust initialization operation, the trusted server 66 of the first node 52 can re-authenticate the authenticated code 62 after the authenticated code is pushed into the memory of the second node.

Continuing with the trust initialization operation, upon storing the memory address range of the authenticated code 62 and re-authenticating the authenticated code 62 of the second node 54, the trusted relationship can be finalized between the trusted server 66 of the first node 52 and the second node 54. In some examples, to finalize the trusted relationship, the trusted server 66 of the first node 52 can release the second node 54 from reset, allowing execution of trusted operations (machine executable code within the recorded memory address range of the static portion of the authenticated code 62), such that the second node 54 starts-up as a trusted client for the trusted server 66 of the first node 52. Alternatively, to finalize the trusted relationship, the trusted server 66 of the first node 52 can provide an activation signal causing the second node 52 to execute the software module 64. In either situation, the trusted server 66 of the first node 52 causes the second node 52 to execute the software module 64 in response to the pushing to finalize the trusted relationship between the trusted sever 66 and the second node 54. Upon finalizing the trusted relationship, the trusted relationship is established and the trust initialization operation is completed. As noted, the trusted relationship is established upon executing each action of the trusted initialization operation. That is, if an action of the trusted initialization operation is unable to complete successfully (such as a failed authentication), the trusted relationship is not established.

Accordingly, the trusted server 66 of the first node 52 can switch to a trust maintenance operation. In the trust maintenance operation, the trusted server 66 of the first node 52 monitors the authenticated code 62 and the corresponding static data and the program counter register 58 of the second node 54 to verify that the second node 54 is only executing trusted operations and to ensure that the corresponding static data is unchanged.

By employment of the system 50, a relatively simple and inexpensive process can be employed to establish and maintain the chain of trust to prevent malicious code (e.g., a computer virus) from a third party from infiltrating the system 50, thereby elevating (improving) security of the system 50. This elevation of security improves overall system performance. Moreover, the chain of trust avoids the need for multiple RoTs 56. Instead, the responsibility for establishing and maintaining the chain of trust is distributed between the RoT 56, the first node 52 and the second node 54.

Figure 2:
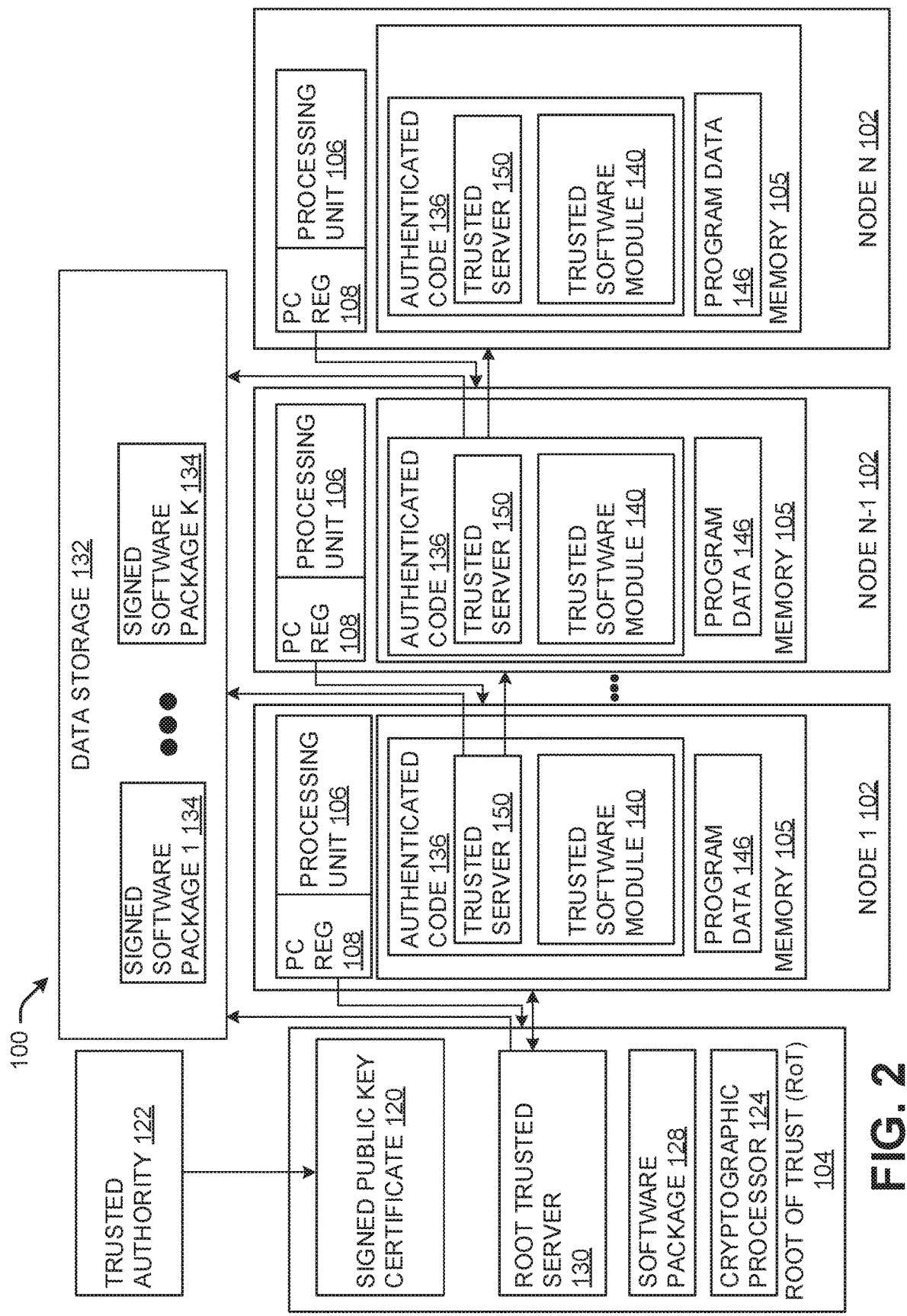
FIG. 2 illustrates another example of a system for establishing and maintaining a chain of trust in a computing environment.

FIG. 2 illustrates another example of a system 100 for establishing and maintaining a chain of trust. The chain of trust can include N number of nodes 102, where N is an integer greater than one, along with a Root of Trust (RoT) 104 from which the chain of trust extends. As one example, the chain of trust in the system 100 can be implemented on a single board computer system, such as a single board computer for a load-balanced system (e.g., an imaging system, a radar system, etc.). Alternatively, the chain of trust in the system 100 can be implemented on a distributed computing system (e.g., a server rack) where each of the nodes 102 are directly coupled to each other (no intervening nodes). That is, each node 102 in the N number of nodes 102 directly communicates with a downstream node 102. Accordingly, each of the nodes 102 can be connected with a data bus, such as a universal serial bus (USB) connection, a parallel data bus connection, a direct network connection, etc. Alternatively, some of the nodes 102 can be implemented on different portions (e.g., different processor cores) of the same processor chip. Similarly, the RoT 104 can be in direct communication with a first node 102 (node 1 of the N number of nodes 102), such that no intervening nodes monitor communication between the Rot 104 and the first node 102.

Each node 102 can be representative of a computer platform. Thus, each node 102 can be implemented as an instance of hardware capable of executing machine readable instructions. Each node 102 can include a memory 105 that stores machine readable instructions and data. The memory 105 can be representative of volatile memory, such as random access memory (RAM). Each node 102 can also include a processing unit 106 that accesses the memory 105 and executes the machine readable instructions. The processing unit 106 can be implemented as a processor core that has an associated program counter register 108 (labeled in FIG. 2 as "PC REG."). Accordingly, for each processor core in the system 100 has an associated program counter. In some examples, a subset (or all) of the N number of nodes 102 can be implemented on a single multi-core processor chip. In other examples, each of the N number of nodes 102 can be implemented as separate computing devices.

The program counter register 108 of each processing unit 106 stores an address of a next instruction that is to be executed by the corresponding processing unit 106. That is, the program counter register 108 "points to" the next instruction to be executed by the corresponding processing unit 106. In some examples, the program counter register 108 can be referred to as an instruction pointer (IP), instruction address register (IAR), an instruction counter (IC) or an instruction sequencer (IS).

The Root of Trust (RoT) 104 can be implemented as an IC chip, such as an Application Specific Integrated Circuit (ASIC) chip, a Field Programmable Gate Array (FPGA), etc. The RoT 104 can include an embedded signed public key certificate 120. The signed public key certificate 120 can be issued by a trusted authority 122 that securely stores a private key of an asymmetric encryption key pair. The signed public key certificate 120 includes a public key of the asymmetric encryption key pair. In this manner, the public key of the signed public key certificate 120 is employable to decrypt data encrypted with the private key of the trusted authority 122. The signed public key certificate 120 also includes a digital signature of the trusted authority 122. The digital signature includes a hash of a public key that has been encrypted with the private key of the trusted authority 122 (also referred to as a message digest), as well as a copy of the (unencrypted) public key and information identifying the hash function (e.g., a name of a standard hash function) in unencrypted form.

The RoT 104 can include a cryptographic processor 124 that the RoT 104 can employ to decrypt the encrypted hash of the public key and to execute the hash function on the (unencrypted) public key. The decrypted hash of the public key can be compared to the results of the hash function on the public key to authenticate the signed public key certificate 120. The RoT 104 can include an embedded software package 128 with machine readable instructions for a root trusted server 130. The embedded software package 128 has been signed (a hash of the plaintext package has been encrypted with a private key) by the trusted authority 122 using the hash function in the signed public key certificate 120 or a different hash function, and the results of the hash function are encrypted with the private key of the trusted authority 122.

Upon boot-up and/or reset, the RoT 104 can execute a sequence of actions to establish the chain of trust on the system 100. During the boot-up sequence, in some examples, the RoT 104 can employ the cryptographic processor 124 to decrypt the encrypted hash of the software package 128 (forming a decrypted hash of the software package 128), execute the same hash function on the software package 128 and compare the results of the hash produced independently by the RoT to the decrypted hash of the software package 128. If the results of the hash of software package 128 match the results of the decrypted hash of the software package 128, the RoT can verify the authenticity and integrity of the software package 128. That is, the RoT 104 can employ the hash function associated with the signed public key certificate 120 and the digital signature of the software package 128 to ensure that the software package 128 has been verified as having originated from the trusted authority 122 (verify authenticity) and that the software package 128 has not been modified (e.g., by a malicious computer application and/or a malicious user) since the software package 128 was signed by the trusted authority 122 (e.g., verify integrity). In other examples, additional and/or alternative authentication techniques are employable to authenticate the software package 128. Continuing with the boot-up sequence, in response to verifying the authenticity and integrity of the software package 128, the cryptographic processor 124 can execute the root trusted server 130. Upon execution, the boot-up sequence of the RoT 104 is completed.

In some examples, the RoT 104 can employ the cryptographic processor 124 to authenticate subordinate certificates that are generated by an entity authorized to do so (e.g., at a secure facility). More particularly each subordinate certificate can be authenticated by the signed public key certificate 120, and (after authentication) the subordinate certificate can be employed to authenticate a software package assigned to a node in the chain of trust.

In some examples, in response to completion of the boot-up, the root trusted server 130 executes a trust initialization operation to establish the chain of trust among the N number of nodes 102 extending from the RoT 104. In some examples, in execution of the trust initialization operation, the root trusted server 130 can set the first node 102 (node 1) to reset to prevent the first node 102 for executing code. Additionally, the root trusted server 130 accesses a data storage 132 and locates (and in some examples, retrieves) one of K number of signed software packages 134 assigned to the first node 102, where K is an integer greater than or equal to one. In some examples, the same signed software package 134 can be employed on multiple nodes 102. In other examples, each node 102 can be assigned a different signed software package 134. Each of the K number of the signed software packages 134 can be digitally signed by the trusted authority 122. In some examples, the signed software package 134 includes an application launcher that can be launched in response to an activation signal. Inclusion of the application launcher can avoid the need to reset the first node 102.

The data storage 132 can be implemented as non-volatile data storage, such as a hard disk drive, a solid state drive, flash memory, etc. Additionally, although the data storage 132 is illustrated as being external to the N number of nodes 102, in some examples, the data storage 132 can be implemented as multiple instances of data storage that are local to each node 102. In other examples, the data storage 132 can be a shared data repository, such as network-attached storage (NAS).

Figure 3:
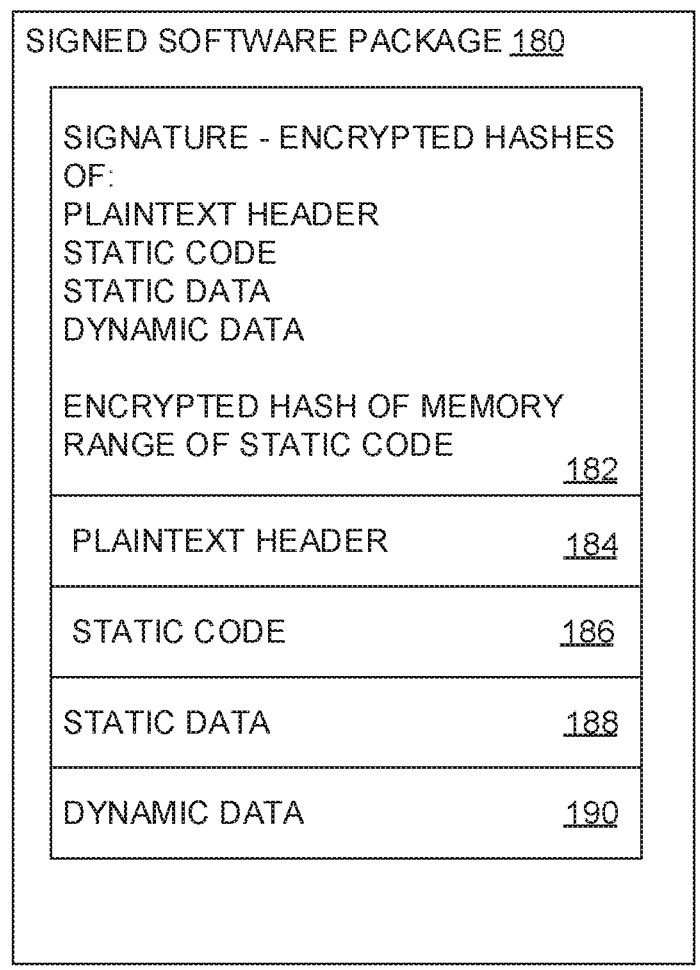
FIG. 3 illustrates an example of a structure of a software module employable to establish and maintain a chain of trust in a computing environment.

FIG. 3 illustrates an example of a parts (partitions) of a signed software package 180 that is employable as an example instance of the K number of signed software packages 134 (including the signed software package 134 assigned to the first node 102). The signed software package 180 includes a signature part 182, a plaintext header part 184, a static code part 186, a static data part 188 and a dynamic data part 190. The signature part 182 includes data for verifying a digital signature of the signed software package 180, or some portion thereof. More particularly, the signature part 182 includes an encrypted hash (using the private key of the trusted authority 122 of FIG. 2) of: the plaintext header part 184, the static code part 186, static data part 188 and the dynamic data part 190. Additionally, in some examples, the signature part 182 includes an encrypted hash of a memory address range of the static code part 186 loaded into a memory of a computing platform (e.g., in a "pristine copy"), as verified by the trusted authority 122.

The plaintext header part 184 includes data that defines a size and position of each of the static code part 186, the static data part 188 and the dynamic data part 190. The static code part 186 includes machine executable instructions for the signed software package 180. The static data part 188 includes data needed by the machine executable instructions in the static code part 186. The dynamic data part 190 includes a dynamic portion of data that is needed by the machine executable instructions in the static code, and such data is modifiable. It is noted that in some examples, some parts of the software module may be omitted. For instance, in some examples, the static data part 188 and/or the dynamic data part 190 may be omitted.

Referring back to FIG. 2, continuing with the trust initialization operation, in response to locating the signed software package 134 assigned to the first node 102, the root trusted server 130 can authenticate the signed software package 134 using the digital signature embedded in the signed software package 134 (e.g., one or more of the encrypted hashes of the signature part 182 of FIG. 3) of the trusted authority 122 and the signed public key certificate 120 to verify the authenticity and integrity of the signed software package 134. Additionally, the root trusted server 130 stores the digital signature (e.g., the signature part 182 illustrated in FIG. 3) and/or a pristine hash of the signed software package 134 for later re-authentication and re-verification.

Continuing with the trust initialization operation, upon authenticating the signed software package 134, the root trusted server 130 pushes the signed software package 134 into the memory 105 of the first node 102 (node 1), where the (authenticated) software package resides as authenticated code 136. As noted, the term "pushes" (and its derivatives) indicates that an external node (the root trusted server 130 of the RoT 104 in the present example) executes or causes execution of a write to a memory (e.g., the memory 105) of another node (e.g., the first node 102).

The authenticated code 136 includes static code corresponding to the signed software package 134 assigned to the first node 102. Thus, the authenticated code 136 can correspond to portions of the signed software package 180 of FIG. 3 that contribute to trust initialization, including but not limited to the static code 186 of the signed software package 180 of FIG. 3. Moreover, the static data can correspond to the static data 188 of the signed software package 180 of FIG. 3. Moreover, the authenticated code 136 includes a trusted software module 140. The trusted software module 140 can include, for example, a boot code (e.g., a Basic Input Output System (BIOS), Coreboot, u-boot, etc.) that can load an operating system (OS) and/or application software for the associated node 102 (e.g., the first node 102). Continuing with the trust initialization operation, upon pushing the authenticated code 136 into the memory 105 of the first node 102, the root trusted server 130 records the memory address range of the static portion of the authenticated code 136 (including the memory address range of the trusted software module 140) and corresponding static data in the first node 102. In some examples, during the trust initialization operation, the root trusted server 130 can apply the hash function on the stored memory address range and decrypt a stored encrypted hash of the memory address range (e.g., included in the signature part 182 of the signed software package 180 of FIG. 3). The hash of the memory address range and the decrypted hash of the memory address range can be compared by the root trusted server 130 to ensure that the authenticated code 136 of the first node 102 is properly stored in the memory 105 of the first node 102. Additionally, in the trust initialization operation, upon pushing the authenticated code 136 into the memory 105 of the first node 102, the root trusted server 130 can re-authenticate the authenticated code 136 using the stored digital signature for the signed software package 134. As an example, the root trusted server 130 can re-authenticate the authenticated code 136 using the encrypted hash of static code (e.g., stored in the signature part 182 of the signed software package 180 of FIG. 3) corresponding to the authenticated code 136 to re-authenticate the authenticated code 136.

Continuing with the trust initialization operation, upon recording the memory address range of the static portion of the authenticated code 136 and re-authenticating the authenticated code, the trusted relationship can be finalized between the root trusted server 130 of the RoT 104 and the first node 102. In some examples, to finalize the trusted relationship, the root trusted server 130 releases the first node 102 from reset. This release allows the first node 102 to boot and execute the machine readable instructions loaded in the memory 105 to finalize the trusted relationship between the root trusted server 130 and the first node 102, such that the first node 102 starts-up as a "trusted client" of the root trusted server 130. Alternatively, to finalize the trusted relationship, the root trusted server 130 can provide an activation signal that causes the first node 102 to execute the machine instructions loaded in the memory 105. In either situation, the root trusted server 130 causes the first node 102 to execute authenticated code in response to the pushing to finalize the trusted relationship between the RoT 104 and the first node 102. Upon finalizing the trusted relationship, the trusted relationship is established and the trust initialization operation is completed. It is noted that the trusted relationship is established upon executing each action of the trusted initialization operation. That is, if an action of the trusted initialization operation is unable to complete successfully (such as a failed authentication), the trusted relationship is not established.

The root trusted server 130 switches to a trust maintenance operation to monitor code being executed by the first node 102. In the trust maintenance operation, the root trusted server 130 monitors operations of the first node 102 to ensure that the first node 102 is only executing trusted operations. More particularly, to monitor the code being executed by the first node 102, the root trusted server 130 monitors authenticated code 136 to re-verify the trusted software module 140. Additionally, to monitor the code being executed by the first node 102, the root trusted server 130 monitors values of the memory addresses stored in the program counter register 108 of the first node 102. These monitors (of the authenticated code 136 and the value in the program counter register 108) can be continuous, periodic and/or asynchronous. As long as the trusted software module 140 can be re-verified and the value in the program counter register 108 is within the memory address range recorded by the root trusted server 130 for the trusted software module 140 (e.g., corresponding to the static code 186 and the static data 188), the root trusted server 130 is assured that the node 102 is still operating as a trusted client of the root trusted server 130, such that the first node 102 is only executing authenticated software, which can be referred to as "trusted operations".

Further, during execution by the first node 102, the trusted software module 140 can manipulate program data 146 (e.g., generate, modify and/or delete data). Such program data 146 can correspond to the dynamic data part 190 of FIG. 3. The root trusted server 130 does not need to monitor this manipulation of the program data 146 in order to maintain the trusted relationship between the root trusted server 130 and the trusted client (the first node 102). That is, the root trusted server 130 can ignore the program data 146 (dynamic data) and still maintain the trusted relationship with the first node 102.

Upon maintenance of trust between the root trusted server 130 and the first node 102 (operating as a trusted client), the first node 102 can be initialized as or elevated to a trusted server for a second (a next) node 102. To initialize or elevate the first node 102 as a trusted sever, machine code (e.g., software) for a trusted server 150 is pushed into the memory 105 of the first node 102 by the root trusted server 130. The trusted server 150 can be formed of machine readable instructions that perform operations similar to the root trusted server 130. In some examples, the root trusted server 130 authenticates the trusted server 150 prior to the pushing. In other examples, the machine executable code for the root trusted server 130 is embedded in the signed software package 134 assigned to the first node 102, such that the root trusted server 130 is authenticated and pushed into the memory 105 of the first node 102 concurrently with the trusted software module 140.

In some examples, the trusted server 150 includes a copy of the signed public key certificate 120 or a subordinate certificate that can be authenticated by the public key certificate 120. In operation, the trusted server 150 of the first node 102 can execute a trust initialization operation to establish a trusted relationship between the trusted server 150 of the first node 102 and a second node 102 (e.g., node 2 of the N number of nodes 102). To execute the trust initialization operation, the trusted server 150 authenticates the signed public key certificate 120 (or a subordinate certificate), which can be embedded in or external to the trusted server 150.

Continuing with the trust initialization operation, in some examples, the trusted server 150 of the first node 102 resets the second node 102 and holds the second node 102 in reset to prevent the second node 102 from executing instructions. Continuing with the trust initialization operation, before the second node 102 is released from reset, the trusted server 150 of the first node 102 accesses the data storage 132 to locate one of the K number of signed software packages 134 assigned to the second node 102. The signed software package 134 assigned to the second node 102 can be implemented in a manner corresponding to the signed software package 180 of FIG. 3. The trusted server 150 of the first node 102 authenticates the signed software package 134 and stores a signature of the signed software package 134 for re-verification (e.g., the signature part 182 of the signed software package 180 of FIG. 3). In some examples, the signed software package 134 includes an application launcher that can be launched in response to an activation signal. Inclusion of the application launcher can avoid the need to reset the second node 102.

Continuing with the trust initialization operation, the trusted server 150 of the first node 102 pushes the signed software package 134 into the memory 105 of the second node 102 to form authenticated code 136 in the second node 102. Continuing with the trust initialization operation, a memory address range of the authenticated code 136 of the second node 102 is stored by the trusted server 150 of the first node for subsequent authentication and/or monitoring. In some examples, the trusted server 150 can execute a hash on the stored memory address range of the second node 102 and decrypt an encrypted hash of a memory address range for static code and corresponding static data of the signed software package 134 (e.g., included in the signature part 182 of the signed software package 180 of FIG. 3). The results of the hash of the memory address range and the decrypted hash of the memory address range can be compared by the trusted server 150 of the first node 102 to ensure that the authenticated code 136 of the second node is properly stored in the memory 105 of the second node 102.

Further, continuing with the trust initialization operation, the trusted server of the first node 102 re-authenticates the authenticated code 136 in the memory 105 of the second node 102. To re-authenticate the code 136, the trusted server 150 of the first node 102 can execute a hash on the authenticated code 136, which corresponds to static code (e.g., the static code part 186 of FIG. 3). Thus, the trusted server 150 can decrypt an encrypted hash of the static code included in a signature part (e.g., the signature part 182 illustrated in FIG. 3) and compare the decrypted hash of the static code with the results of the hash on the authenticated code 136 to re-authenticate the authenticated code 136.

Continuing with the trust initialization operation, upon storing the memory address range of the authenticated code 136 of the second node 102 and re-authenticating the authenticated code 136, the trusted relationship can be finalized between the trusted server 150 of the first node 102 and the second (next) node 102. In some examples, to finalize the trusted relationship, the trusted server 150 of the first node 102 can release the second node 102 from reset, allowing execution of trusted operations (machine executable code within the recorded memory address range), such that the second node 102 starts-up as a trusted client for the trusted server 150 of the first node 102. Upon finalizing the trusted relationship, the trusted relationship is established and the trust initialization operation is completed. It is noted that the trusted relationship is established upon executing each action of the trusted initialization operation. That is, if an action of the trusted initialization operation is unable to complete successfully (such as a failed authentication), the trusted relationship is not established. Alternatively, to finalize the trusted relationship, the trusted server 150 of the first node 102 can provide an activation signal causing the second node 102 to execute the machine instructions loaded in the memory 105. In either situation trusted server 150 of the first node 102 causes the second node 102 to execute authenticated code in response to the pushing to finalize the trusted relationship between the trusted server 150 of the first node 102 and the second node 102.

Accordingly, the trusted server 150 of the first node 102 can switch to the trust maintenance operation. In the trust maintenance operation, trusted server 150 of the first node 102 monitors the authenticated code 136 and the program counter register 108 of the second node 102 in a manner similar to the operations of the root trusted server 130 of the RoT 104. In this manner, the trusted server 150 of the first node 102 is assured that the second node 102 is only executing trusted operations. Moreover, similar to the trusted software module 140 of the first node 102, program data 146 (dynamic data) manipulated by the trusted software module 140 of the second node 102 does not need to be monitored or authenticated by the trusted server 150 of the first node 102 to maintain the trusted relationship.

Upon maintaining the trusted relationship between the second (next) node 102 and the trusted server 150 of the first node 102, the second node 102 can also be elevated to a trusted server 150 for another downstream node 102 in the same or similar manner. In fact, each of the second (2) to the penultimate (N−1) nodes 102 can operate as a trusted client for a trusted server 150 operating on a previous node 102 in the chain of trust. Moreover, a terminating (Nth) node 102 can operate as a trusted client of the trusted server 150 operating on the penultimate (N−1) node to complete the chain of trust. However, the terminating node 102 (final node) does not operate as a trusted server, since each trusted server 150 establishes and maintains trust with downstream nodes 102.

It is noted that in other examples, each trusted server 150 and/or the root trusted server 130 can have multiple trusted clients. That is, although the chain of trust for the system 100 is illustrated as being a single branch (linear) chain of trust, other configurations are possible, as explained herein.

As noted, the root trusted server 130 and the trusted servers 150 operating on the first to N−1 nodes 102 maintains the chain of trust to ensure that only trusted operations are being executed throughout the N number of nodes 102 and the RoT 104. As an example, if a given trusted software module 140 operating on a given node 102 is modified and/or moved to a different memory address, such modification and/or movement would change of a hash of the on the (previously) authenticated code 136 such that the trusted server 150 immediately upstream the of the given trusted software module would not be able to re-verify the authenticity and integrity of given trusted software module 140 which in turn cause the trusted server 150 immediately upstream of the given software module 140 to detect the possibility that a non-trusted operation is being executed on the given node 102. Additionally, or alternatively, such a modification may cause the associated program counter register 108 to point to an address range outside the range designated for the static portion of the authenticated code, which in turn cause the trusted server 150 immediately upstream of the given software module 140 to detect the possibility that a non-trusted operation is being executed on the given node 102. For instance, if the upstream trusted server 150 detects a failed re-verification of the trusted software module 140 and/or a detection of a value in the program counter register 108 outside the memory address range recorded for the static portion of the authenticated code 136 of the given node 102, the upstream trusted server 150 can detect the possibility of a non-trusted operation being executed at the given node 102.

In the event that either the root trusted server 130 or any of the N−1 trusted servers 150 operating on the nodes 102 detects a possibility of a non-trusted operation being executed at a downstream node 102, the trusted server 150 (or the root trusted server 130) can sever the chain of trust for downstream nodes 102. For example, if the trusted server 150 operating on the second node 102 detects the possibility of an untrusted operation on the third node 102 (operating as a trusted client to the trusted server 150), the trusted server 150 operating on the second node 102 can sever the chain of trust for any nodes 102 downstream of the second node 102. In some examples, the trusted server 150 of the second node 102 can generate a report characterizing the detected possible non-trusted operation and send the report to an external system. To re-establish the chain of trust, the trusted server 150 detecting the possible non-trusted operation can reset the downstream node 102 and re-execute the trust initialization operation and the trust maintenance operation. This process can be repeated for each downstream node until the last node (node N) is once again operating as a trusted client of the trusted server 150 operating on the penultimate (N−1) node 102.

By employment of the system 100, the chain of trust can be efficiently established and maintained to prevent malicious code and/or hackers from accessing/modifying the system 100 thereby elevating (improving) security, which elevates overall system performance. Moreover, the burden of establishing and maintaining trusted relationships in the chain of trust is distributed among the nodes 102 of the chain of trust. In this manner, a single RoT 104 can be employed throughout the chain of trust. Additionally, in the example illustrated, the RoT 104 establishes and maintains trust with a single node (the first node 102). Thus, in this example, a relatively slow and inexpensive RoT 104 can be employed since the RoT 104 can avoid the need to establish or maintain a trusted relationship with multiple trusted clients.

Figure 4:
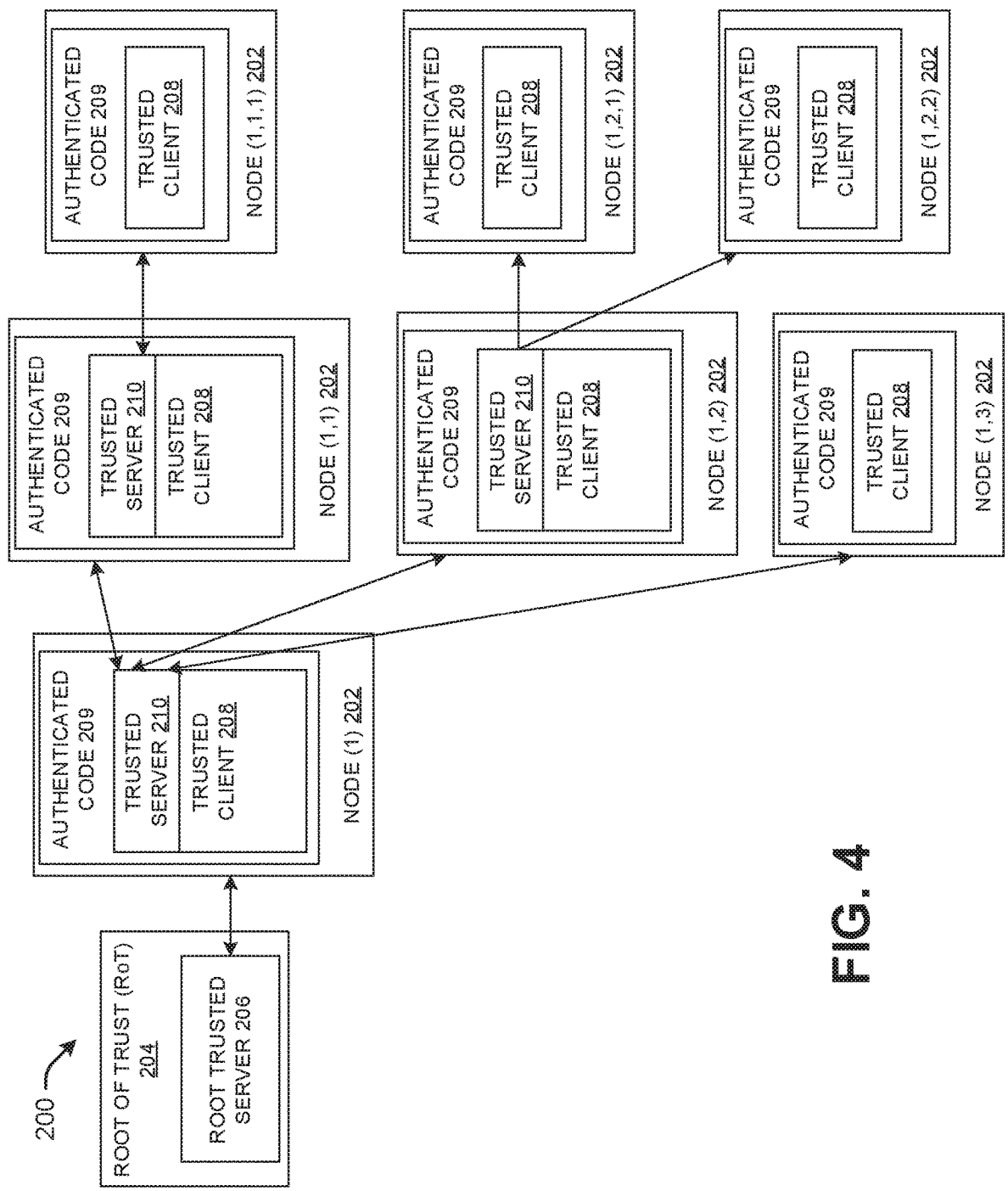
FIG. 4 illustrates an example of system with a multi-branch chain of trust.

FIG. 4 illustrates a diagram of a system 200 for establishing a multi-branch chain of trust among nodes 202 and a Root of Trust 204. Each node 202 can be implemented in a manner similar to a node 102 illustrated in FIG. 2, and the RoT 204 can be implemented in a manner similar to the RoT 104 of FIG. 2. For purposes of simplification of explanation, it is presumed that in the system 200, the chain of trust has been established and maintained in the manner described herein (such as with respect to FIGS. 1 and/or 2).

In the example system 200 the array of nodes 202 each include a unique index number. The unique index number indicates a logical position of a given node 202. For instance, the node 202 monitored by a root trusted server 206 of the RoT 204 is a first order node that has a one dimension index number of (1). As used herein the "order" of a node indicates the number of nodes 202 that separate a given node 202 from the RoT 204. Additionally, second order nodes 202 that stem directly from node (1) have a two dimension index number, such as nodes (1,1), (1,2) and (1,3). Each third order node 202 includes a three dimension index number such as nodes (1,1,1), (1,2,1) and (1,2,2). In this manner, the logical position of each node 202 can be identified. In other examples, a different identification scheme for the nodes 202 could be employed.

Each node 202 with at least one downstream node 202 executes a trusted client 208. That is, each such node 202 can be representative of a computing platform executing code that is within a memory address range of authenticated code 209 that includes a trusted server 210 (and a software module) operating on the respective node 202. In the example illustrated, nodes (1) and (1,2) have established and are maintaining a trusted relationship for multiple nodes 202 acting as trusted clients 208 and node (1,1) has established and maintains trust with a single node operating as a trusted client 208. Stated differently, nodes (1) and (1,2) each establish and maintain trusted relationship with subsets of the plurality of nodes 202 within the system 200. Additionally, terminating nodes 202, namely nodes (1,3), (1,1,1), (1,2,1) and (1,2,2) at the end of branches in the chain of trust do not include the trusted server 210 within the authenticated code 209.

The system 200 demonstrates the flexibility achievable for the chain of trust described herein. In particular, nearly any configuration for the multi-branch chain of trust is possible. Additionally, the complexity of the multi-branch chain of trust does not compromise the security of the chain of trust. Rather, the trust of each node 202 can be securely traced back to the RoT 204.

Figure 5:
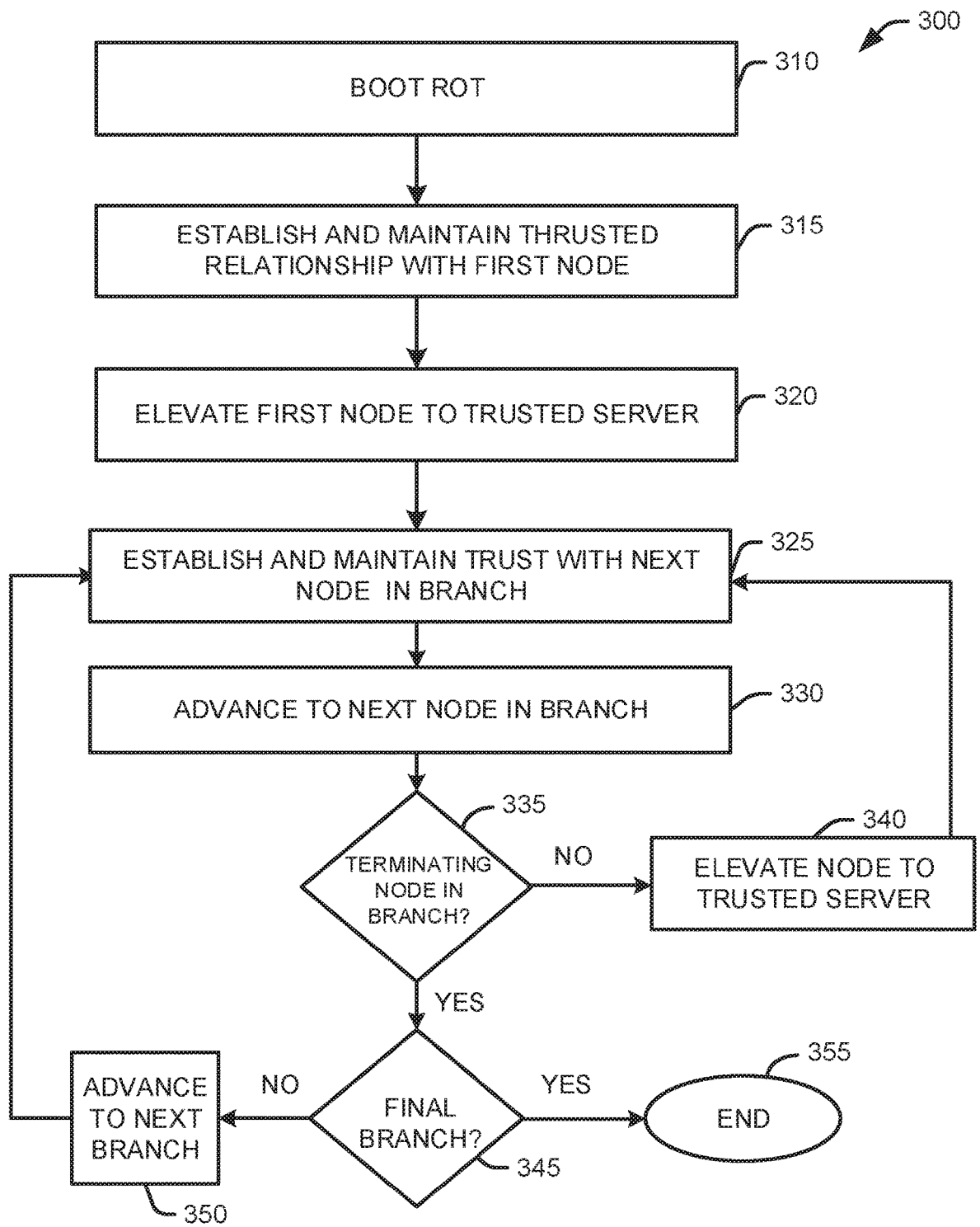
FIG. 5 illustrates an example of a method for establishing and maintaining a chain of trust.

FIG. 5 illustrates an example of a method 300 for establishing and maintaining a chain of trust amongst nodes of a computing environment. The method 300 can be implemented, for example, by the system 50 of FIG. 1, the system 100 of FIG. 2 and/or the system 200 of FIG. 4. In some examples, the chain of trust can be a multi-branch chain of trust, such as illustrated in FIG. 4. In other examples, the chain of trust can be a single-branch chain of trust, such as illustrated in FIGS. 1 and 2.

At 310, an RoT (e.g., the RoT 104 of FIG. 2) can boot, which causes a root server to execute on the RoT. At 315, the root trusted server can establish and maintain a trusted relationship with a first node (e.g., a node 102 of FIG. 2), such that the first node starts-up and continues to operate as a trusted client of the root trusted server. At 320, the root trusted server can elevate the first node (a trusted client) to a trusted server.

In the method 300, initially the first node is the current node, and a first branch is a current branch. At 325, a trusted server of a current node (the first node in the first iteration) can establish and maintain a trusted relationship with a next node of the plurality of nodes within a current branch. At 330, the method 300 advances to the next node in the current branch. At 335, a determination is made as to whether the current node is a terminating (final) node in the current branch. As an example, FIG. 4, nodes (1,1,1), (1,2,1), (1,2,2) and (1,3) are each terminating nodes. If the determination at 335 is negative (e.g., NO), the method 300 proceeds to 340. If the determination at 335 is positive (e.g., YES), the method 300 proceeds to 345. At 340, the current node is elevated to a trusted server, and the method 300 returns to 325.

At 345, a determination is made as to whether the current branch is a final branch of the chain of trust. If the determination at 345 is negative (e.g., NO), the method 300 proceeds to 350. If the determination at 345 is positive (e.g., YES), the method proceeds to 355. At 350, the current branch is advanced to the next branch (of a multi-branch chain of trust) and the method returns to 325. At 355, the method 300 ends.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for establishing and maintaining a chain of trust comprising:
    a root of trust (RoT) executing a root trusted server implemented on a first hardware device that:
        after boot-up, holds a given node implemented on a second hardware device in a plurality of nodes in reset and pushes authenticated code into memory of the given node in the plurality of nodes, while the given node is held in reset;
        records a memory address range of a static portion of the authenticated code and static data in the given node and releases the given node from reset to allow the given node to boot;
        causes the given node to execute the authenticated code in response to the pushing to establish a trusted relationship between the trusted server of the RoT and the given node; and monitors the given node to ensure that the given node executes trusted operations and to ensure that the authenticated code and static data in the given node are unchanged;

wherein the authenticated code in the memory of the given node comprises a trusted server that:

holds another node implemented on a third hardware device in the plurality of nodes in reset and pushes authenticated code into memory of the other node in the plurality of nodes, while the other node is held reset;

records a memory address range of a static portion of the authenticated code and static data in the other node, and releases the other node from reset to allow the other node to boot;

causes the other node to execute the authenticated code in response to the pushing to establish a trusted relationship between the trusted server of the given node and the other node; and monitors the other node to ensure that the other node executes trusted operations by comparing a value of a program counter register of the other node in the plurality of nodes to the recorded memory address range of the static portion of the authenticated code in the other node responsive to the other node executing the authenticated code; and re-verifies the authenticity and integrity of the static portion of a software module operating on the node to ensure that the authenticated code and the static data in the other node are unchanged, subsequent to the recording of the memory address range of a static portion of the authenticated code and static data in the other node.

2. The system of claim 1, wherein the RoT comprises a signed public key certificate comprising:

a public key of public/private key pair issued from a trusted authority; and an encrypted hash of a plaintext public key that is decryptable only with the public key.

3. The system of claim 1, wherein the root trusted server employs the signed public key certificate to verify the authenticity and integrity of a signed software package corresponding to the authenticated code pushed to the given node of the plurality of nodes.

4. The system of claim 3, wherein the trusted server of the given node comprises the signed public key certificate and the trusted server employs the signed public key certificate to verify the authenticity and integrity of a signed software package corresponding to the authenticated code pushed to the other node of the plurality of nodes.

5. The system of claim 4, wherein the trusted server of the given node severs the trusted relationship with the other node in response to a failure to re-verify the authenticity and the integrity of the static portion of the authenticated code.

6. The system of claim 3, wherein the RoT re-authenticates the authenticated code in response to the recording of the memory address range of the given node, the re-authenticating comprising:

executing a hash on the authenticated code and the static data in the given node;

comparing the hash of the authenticated code and the static data to a decrypted version of a hash of the authenticated code and the static data embedded in the signed software package;

executing a hash of the memory address range of the given node; and comparing the hash of the memory address range of the given node to a decrypted version of a hash of the memory address range of the given node embedded in the signed software package.

7. The system of claim 1, wherein the trusted server of the given node severs the trusted relationship with the other node in response to detecting that the value of the program counter register is outside the recorded memory address range of the static portion of the authenticated code in the other node.

8. The system of claim 1, wherein the trusted server of the given node elevates the other node to a trusted server for at least one of the plurality of nodes that is downstream of the other node.

9. The system of claim 1, wherein each of the plurality of nodes are implemented on a single board computer.

10. The system of claim 1, wherein the given node and the other node are implemented on a multi-core processor.

11. The system of claim 10, wherein the RoT is implemented on an integrated circuit (IC) chip.

12. The system of claim 1, wherein the given node and the other node nodes communicate directly.

13. A system for establishing and maintaining a chain of trust comprising:

a root of trust (RoT) executing a root trusted server implemented on a first hardware device that:

establishes, in response to completing boot-up, a trusted relationship with a first node of a plurality of nodes implemented on discrete hardware devices separate from the first hardware device, wherein the establishing by the RoT comprises:

holding the first node in reset and pushing authenticated code into memory of the first node, while the first node is held in reset; and recording a memory address range of a static portion of the authenticated code and static data in the first node and releasing the first node from reset to allow the first node to boot in response to the pushing;

wherein the trusted relationship ensures that the first node of the plurality of nodes executes trusted operations on authenticated code stored in memory of the first node and to ensure that the authenticated code and static data in the first node are unchanged;

and the authenticated code in the memory of the first node comprises a trusted server that establishes and maintains a trusted relationship with a subset of nodes in the plurality of nodes wherein the establishing and maintaining by the first node comprises:

holding each node in the subset of nodes in reset and pushing authenticated code into memory of each node in the subset of nodes in the plurality of nodes, while each node in the subset of nodes is held in reset;

recording a memory address range of a static portion of the authenticated code and static data in each node in the subset of nodes, and releasing each node of the subset of nodes from reset to allow each node in the subset of nodes to boot in response to the pushing;

causing each node in the subset of nodes to execute the authenticated code in response to the pushing to establish a trusted relationship between the trusted server of the first node and each node of the subset of nodes; and monitoring each node in the subset of nodes to ensure that each node in the subset of nodes executes trusted operations by comparing a value of a program counter register of each node of the subset of nodes to the recorded memory address range of the static portion of the authenticated code in each node in the subset of nodes responsive to each node in the subset of nodes to executing the authenticated code; and re-verifying the authenticity and integrity of the static portion of a software module operating on each node of the subset of nodes to ensure that the authenticated code and static data in each node in the subset of nodes are unchanged, subsequent to the recording of the memory address range of a static portion of the authenticated code and static data in each node in the subset of nodes.

14. The system of claim 13, wherein the subset of nodes comprises a second node and the trusted server of the first node elevates the second node to a trusted server for a third node of the plurality of nodes.

15. The system of claim 13, wherein the subset of nodes comprises at least two of the plurality of nodes.

16. The system of claim 13, wherein the RoT is implemented on an integrated circuit (IC) chip in direct communication with the first node.

17. A method comprising:
establishing and maintaining, by a root trusted server executing on a root of trust (RoT) on a first hardware device, a trusted relationship between the root trusted server and a first node of a plurality of nodes, wherein the root trusted server ensures that the first node executes trusted operations and ensures that authenticated code and static data in the first node are unchanged, wherein the establishing and maintaining by the RoT comprises:
holding the first node in reset and pushing authenticated code into memory of the first node on a second hardware device in the plurality of nodes, while the first node is held in reset; and
recording a memory address range of a static portion of the authenticated code and static data in the first node and releasing the first node from reset to allow the first node to boot in response to the pushing;
elevating, by the root trusted server, the first node to a trusted server, wherein the first node executes the trusted server as a trusted operation; and
establishing and maintaining, by the trusted server executing on the first node, a trusted relationship with a second node of the plurality of nodes, wherein the establishing and maintaining by the first node comprises:
holding at the second node on a third hardware device in reset and pushing authenticated code into memory of the second node, while the second node is held in reset; and
recording a memory address range of a static portion of the authenticated code and static data in the second node and releasing the second node from reset to allow the second node to boot in response to the pushing;
monitoring, at the first node in the plurality of nodes, to ensure that the second node in the plurality of nodes executes trusted operations by comparing a value of a program counter register of the second node in the plurality of nodes to the recorded memory address range of the static portion of the authenticated code in the second node in the plurality of nodes responsive to the second node executing the authenticated code; and
re-verifying, at the first node, the authenticity and integrity of the static portion of a software module operating on the second node to ensure that the authenticated code and static data in the second node in the plurality of nodes are unchanged, subsequent to the recording of the memory address range of a static portion of the authenticated code and static data in the second node; and
wherein the RoT has access to a program counter register of the first node and the trusted server executing on the first node has access to the program counter register of the second node, and the trusted server executing on the first node ensures that the second node executes trusted operations and ensures that the authenticated code and static data in the second node are unchanged.

18. The method of claim 17, further comprising:
elevating, by the trusted server executing on the first node, the second node to a trusted server, wherein the second node executes the trusted server as a trusted operation; and
establishing and maintaining, by the trusted server executing on the second node, a trusted relationship with a third node of the plurality of nodes, wherein the trusted server executing on the second node ensures that the third node executes trusted operations.

\* \* \* \* \*